UNITED STATES PATENT OFFICE.

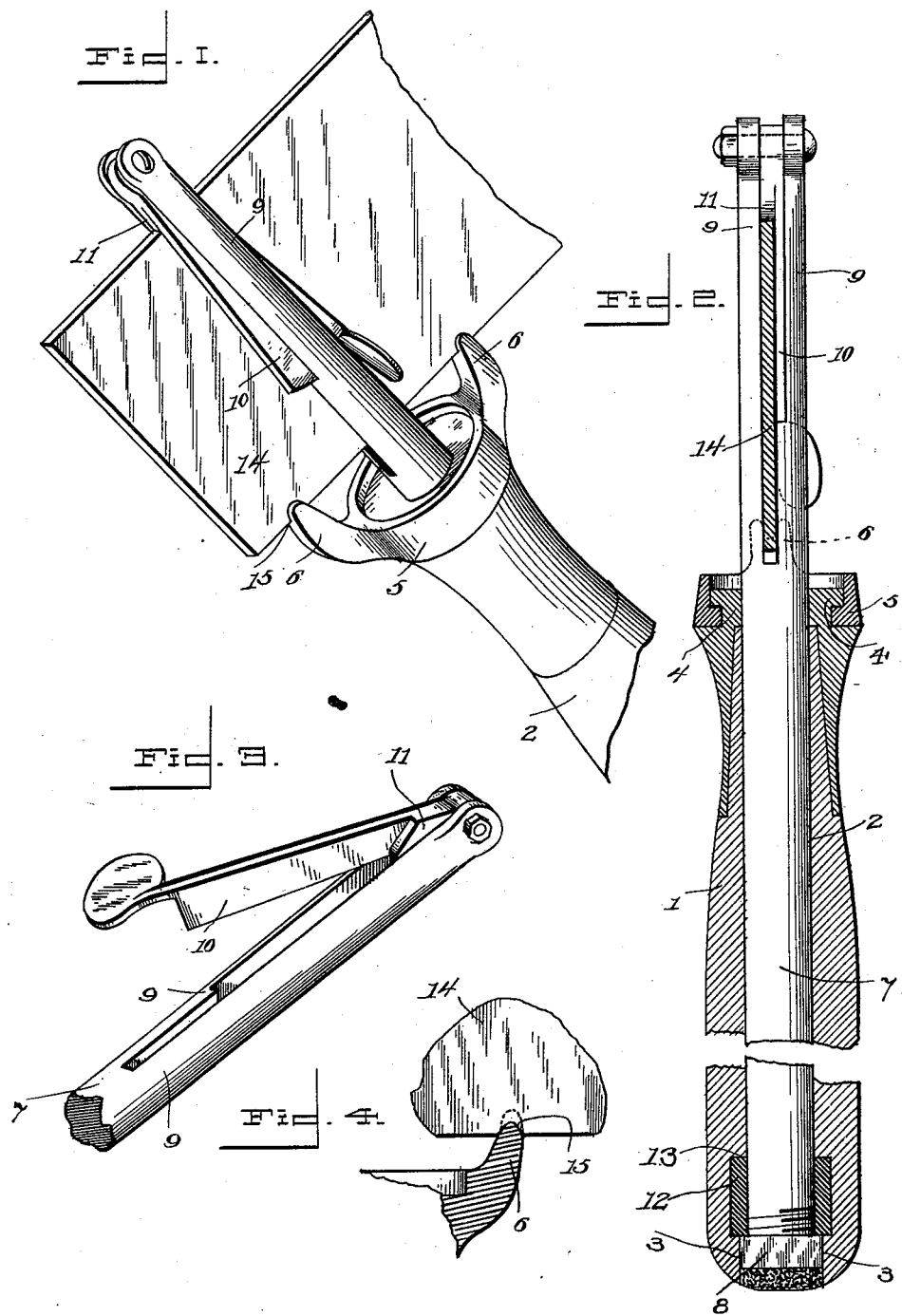

DAVID I. GREEN, OF FRONTIER, MICHIGAN.

SAW-HANDLE.

SPECIFICATION forming part of Letters Patent No. 602,158, dated April 12, 1898.

Application filed February 2, 1898. Serial No. 668,824. (No model.)

*To all whom it may concern:*

Be it known that I, DAVID I. GREEN, a citizen of the United States, residing at Frontier, in the county of Hillsdale and State of Michigan, have invented certain new and useful Improvements in Saw-Handles; and I do declare the following to be a full, clear, and exact description of the invention, such as will enable others skilled in the art to which it appertains to make and use the same.

My invention has relation to saw-handles, and more particularly to handles for crosscut-saws.

The object of the invention is to provide a device of this character which may be easily and quickly detached from the saw should the tree fall in the wrong direction, thereby preventing the saw being broken, as is commonly the case in saws where the handle cannot be quickly removed.

With this object in view the invention consists in certain features of construction and combination of parts, which will be hereinafter fully described and claimed.

In the accompanying drawings, Figure 1 is a perspective view of my improved handle, showing it attached to a portion of a crosscut-saw. Fig. 2 is a longitudinal sectional view through the handle. Fig. 3 is a detail perspective view of the cam-lever, and Fig. 4 is an enlarged detail view of one of the ears.

In the drawings, 1 denotes the grip of the handle, which is provided with a central bore 2 and has at its outer end a square recess 3 and at its inner end an annular collar 4, to which is swiveled a ring 5, having projecting slotted ears 6.

7 denotes the handle-shank, the inner end of which is rounded and projects through the bore of the grip and screws into a nut 8, seated in a square recess at the inner end of the handle. The bore at the end of the handle may be filled with some material impervious to water—such, for instance, as cork or plastic rubber—to prevent the rusting of the threads at the end of the shank. The inner end of the shank is bifurcated to form arms 9, between which is pivoted a lever 10, having near its upper end a cam-lug 11.

12 denotes rubber packing confined between the shoulder 13 in the bore of the grip and the nut on the end of the shank.

14 denotes the saw-blade, which has its back preferably provided with notches 15, which seat in the slotted lugs. The saw-blade is placed between the bifurcated members of the handle-shank, with its notches in the notched lugs of the swivel-ring.

The handle is engaged with the saw by passing the end of the saw between the bifurcated members of the shank and engaging the notches in the back of the saw with the notches in the lugs of the swivel-ring. The cam-lever is then pressed downward and engages the opposite edge of the saw and firmly clamps the saw to the swivel-ring. In order to prevent the saw buckling or splitting, due to the clamping action of the cam, the rubber packing is provided, which allows a slight give of the shank. After the handle has thus been clamped to the saw should it be desired to more firmly clamp the saw the swivel-ring is held in one hand and with the other hand the grip is rotated, thus drawing the cam more firmly into engagement with the edge of the saw. This is accomplished by reason of the outer end of the shank having a screw-threaded engagement with the nut, which is non-rotatable relative to the grip.

From the foregoing description, taken in connection with the accompanying drawings, the construction and operation of the invention will be readily understood without requiring an extended explanation.

It is evident that in use should the tree being sawed through happen to tilt and fall in the wrong direction, simply by tripping the cam the handle may be disengaged from one end of the saw, and the operator at the other handle may quickly draw the saw through and from the tree, thus preventing it being broken by the falling trunk.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. In a saw-handle, the combination with the grip having a longitudinal bore, a shank extending through said bore and provided with two parallel arms at one end and adapted to embrace the sides of the saw, and a cam-lever pivoted between said ends and adapted to engage the saw and clamp it in position, substantially as set forth.

2. In a saw-handle, the combination with a grip having a longitudinal bore and a swivel-ring, a shank extending through said bore and having a screw-threaded connection with the grip, said shank being provided with parallel arms, and a lever pivoted between said arms and provided with a cam, substantially as set forth.

3. In a saw-handle, the combination with the grip having a longitudinal bore, a nut secured in said bore against rotation, a rubber packing confined between the nut and a shoulder in said bore, a shank extending through the bore and having one end screw-threaded to engage the nut and the other end bifurcated, a ring swiveled to the inner end of said grip, and a cam-lever pivoted between said bifurcated arms, substantially as set forth.

In testimony whereof I have hereunto set my hand in presence of two subscribing witnesses.

DAVID I. GREEN.

Witnesses:
ER HUKILL,
LEE HUKILL.